P. D. ROBBINS.
SAW-SHARPENING MACHINE.
No. 187,909. Patented Feb. 27, 1877.
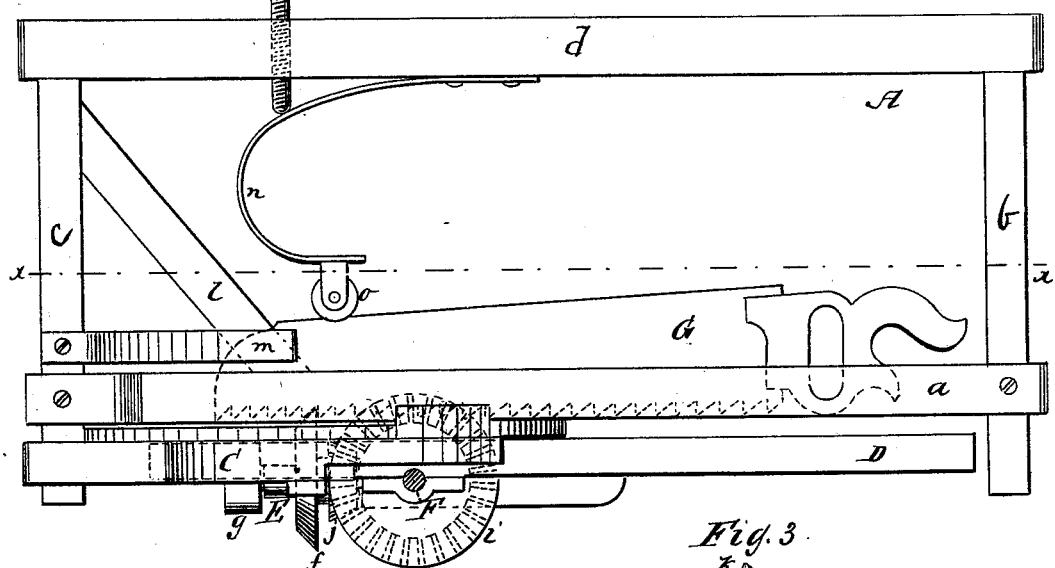
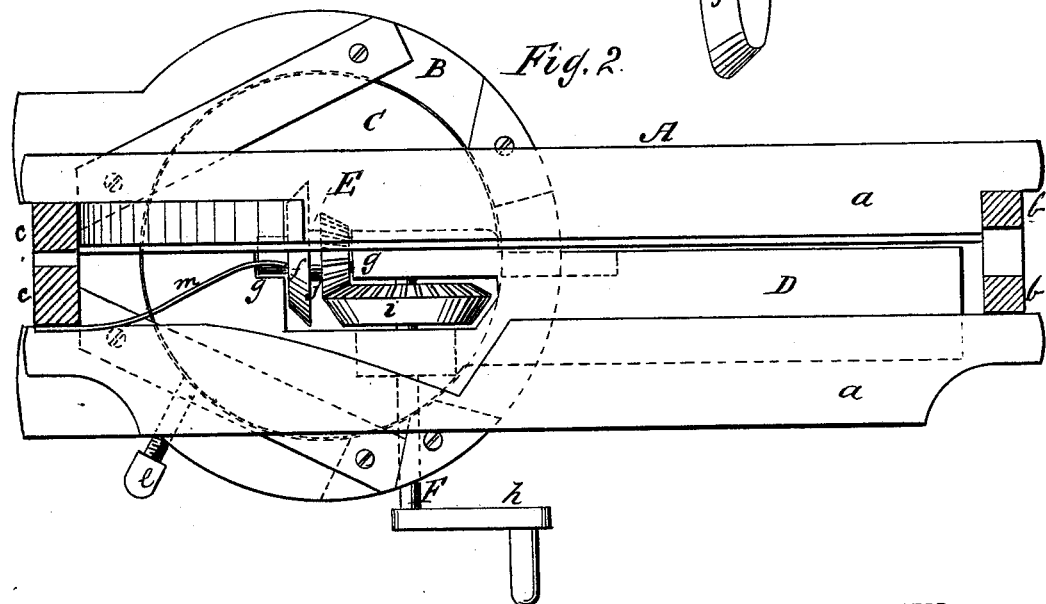
WITNESSES:
E. Wolff.
John Goethals.
INVENTOR:
P. D. Robbins.
BY
ATTORNEYS.

UNITED STATES PATENT OFFICE.

PARKER D. ROBBINS, OF HARRELLSVILLE, NORTH CAROLINA.

IMPROVEMENT IN SAW-SHARPENING MACHINES.

Specification forming part of Letters Patent No. 187,909, dated February 27, 1877; application filed September 2, 1876.

*To all whom it may concern:*

Be it known that I, PARKER D. ROBBINS, of Harrellsville, county of Hertford, and State of North Carolina, have invented a new and Improved Saw-Sharpening Machine, of which the following is a specification:

Figure 1 is a side elevation. Fig. 2 is a bottom view. Fig. 3 is a perspective view of the circular file.

My invention consists of a circular or rotary file having a diagonal groove on its face for carrying the saw forward, placed on a suitable mandrel, and a turn-table, to which the said mandrel is journaled, and which can be adjusted to give the proper bevel to the teeth being filed.

The object of the invention is to rapidly file the teeth of a saw at any desired bevel, by rotating the file by means of a crank and suitable gearing, the saw being drawn forward by the diagonal slot in the edge of the file.

Similar letters of reference indicate corresponding parts.

A is the frame of the machine, consisting of the bars $a\ a$, slotted end pieces $b\ c$, and bar $d$. B is a circular socket, attached to the bars $a\ a$ of the frame A, for receiving the turn-table C, and is provided with a set-screw, $e$, for holding the turn-table in any desired position. D is a lever attached to the turn-table for the purpose of adjusting it. A mandrel, E, carrying a rotating file, $f$, is placed centrally in the turn-table, and is provided with journal-boxes $g$, that are attached to the turn-table. F is a shaft, provided with the crank $h$ and bevel-wheel $i$, and is provided with journal-boxes attached to the turn-table. The bevel-wheel $i$ meshes with a pinion, $j$, on the mandrel E. The circular file $f$ is provided with a slot, $k$, across its face for moving the saw forward, and is beveled to give the required form to the saw-teeth. The saw G is placed against the brace or guide $l$, with a tooth at its heel resting on the rotary file. It is pressed against the guide $l$ by the spring $m$, and is held down upon the file by the spring $n$, which carries the grooved friction-roller $o$, that rests on the back of the saw. The pressure of this spring is increased or diminished by turning the set-screw $p$.

On rotating the file by means of the crank $h$ the teeth are sharpened, and moved forward by the slot $k$, which moves the saw one tooth forward at every revolution when the teeth are filed straight across; but when the teeth are to be beveled, the slot must be of such pitch as will carry the saw forward by engaging with alternate teeth, and the saw must be run through the machine twice, to give the required bevel to the alternate teeth. The file is adjusted to any desired bevel by loosening the screw $e$, and turning the table C in one direction or the other by means of the lever D. Files of different forms and pitches are used for different sizes and forms of teeth.

I am aware that it is not new to use a rotary file provided with two screw-threads having twice the pitch of the teeth, or to use a spiral feeding-blade; but

What I claim is—

1. The combination, with the guide $l$ and lateral spring $m$, of the grooved roll $o$, and spring-presser on the top of saw, as shown and described, to hold the saw with a yielding pressure.

2. The combination of the turn-table C, shaft F, crank $h$, wheel $i$, mandrel E, pinion $j$, rotary file $f$, socket B, set-screw $e$, springs $m$ $n$, set-screw $p$, and frame A, substantially as and for the purpose specified.

PARKER D. ROBBINS.

Witnesses:
NORMAN H. SHAW,
ZACHEUS EARLY.